(12) United States Patent
Tsuzuki et al.

(10) Patent No.: US 11,958,756 B2
(45) Date of Patent: Apr. 16, 2024

(54) THIN-FILM-LIKE COMPOSITE OF NANOCRYSTAL

(71) Applicant: FURUKAWA ELECTRIC CO., LTD., Tokyo (JP)

(72) Inventors: Yoshikazu Tsuzuki, Tokyo (JP); Mariko Wakae, Tokyo (JP); Kazuhiko Kurusu, Tokyo (JP)

(73) Assignee: FURUKAWA ELECTRIC CO., LTD., Tokyo (JP)

( * ) Notice: Subject to any disclaimer, the term of this patent is extended or adjusted under 35 U.S.C. 154(b) by 149 days.

(21) Appl. No.: 16/563,180

(22) Filed: Sep. 6, 2019

(65) Prior Publication Data

US 2020/0017367 A1    Jan. 16, 2020

Related U.S. Application Data

(63) Continuation of application No. PCT/JP2018/008689, filed on Mar. 7, 2018.

(30) Foreign Application Priority Data

Mar. 7, 2017 (JP) .................................. 2017-043204

(51) Int. Cl.
*C01G 3/02* (2006.01)
*B01D 53/86* (2006.01)
(Continued)

(52) U.S. Cl.
CPC .............. *C01G 3/02* (2013.01); *B01D 53/86* (2013.01); *B01J 23/72* (2013.01); *B01J 23/76* (2013.01);
(Continued)

(58) Field of Classification Search
CPC ...... B01J 35/026; B01J 23/72; B01J 35/1004; B01J 37/0072; B01D 53/94; C01G 3/02; C01P 2002/74; C01P 2006/12
See application file for complete search history.

(56) References Cited

U.S. PATENT DOCUMENTS

2013/0089739 A1    4/2013    Polshettiwar et al.
2015/0050496 A1    2/2015    Sueda et al.
(Continued)

FOREIGN PATENT DOCUMENTS

CN    103708551 A    4/2014
CN    104176763 A    12/2014
(Continued)

OTHER PUBLICATIONS

J. Liao et al., Facile fabrication of Ti supported CuO film composed of bamboo-leaf-like nanosheets and their high catalytic performance in the oxidative degradation of methylene blue with hydrogen peroxide, Applied Catalysis A: General, 2015, 491, 94-99 (Year: 2015).*

(Continued)

*Primary Examiner* — Melissa S Swain
*Assistant Examiner* — Keling Zhang
(74) *Attorney, Agent, or Firm* — Birch, Stewart, Kolasch & Birch, LLP (57) ABSTRACT

An object of the present disclosure is to provide a thin-film-like composite of nanocrystal, as a nanocrystalline material having excellent handling properties, which can overcome the above-mentioned problems of a nanocrystalline material having a powdery form while satisfactorily maintaining the properties of the nanocrystalline material (e.g., excellent catalytic activity). A thin-film-like composite of nanocrystal, characterized in that the thin-film-like composite of nanocrystal includes a thin-film-like connected assembly in which (Continued)

a plurality of nanocrystalline pieces each having a flake-like form and having a main surface and an end surface are connected to each other, the main surfaces of the plurality of nanocrystalline pieces exposed to the outside of the connected assembly are arranged so as to form gaps therebetween, and the connected assembly has a plan view area of 1 mm$^2$ or more.

5 Claims, 10 Drawing Sheets

(51) Int. Cl.
| | |
|---|---|
| *B01J 23/72* | (2006.01) |
| *B01J 23/76* | (2006.01) |
| *B01J 35/00* | (2006.01) |
| *B01J 35/10* | (2006.01) |
| *C09K 5/14* | (2006.01) |
| *B82Y 30/00* | (2011.01) |

(52) U.S. Cl.
CPC ......... *B01J 35/006* (2013.01); *B01J 35/1004* (2013.01); *C09K 5/14* (2013.01); *B01D 2255/207* (2013.01); *B82Y 30/00* (2013.01); *C01P 2002/74* (2013.01); *C01P 2004/61* (2013.01); *C01P 2004/64* (2013.01); *C01P 2006/12* (2013.01)

(56) References Cited

U.S. PATENT DOCUMENTS

| | | | |
|---|---|---|---|
| 2018/0133649 A1 | 5/2018 | Tsuzuki et al. | |
| 2018/0134550 A1 | 5/2018 | Tsuzuki et al. | |

FOREIGN PATENT DOCUMENTS

| | | |
|---|---|---|
| EP | 3 323 507 A1 | 5/2018 |
| JP | 2013-240756 A | 12/2013 |
| JP | 2016-11247 A | 1/2016 |
| WO | WO 2013/133412 A1 | 9/2013 |
| WO | WO 2017/010491 A1 | 1/2017 |
| WO | WO 2017/010492 A1 | 1/2017 |

OTHER PUBLICATIONS

Hideki et al., Machine translation of JP2013240756A (Year: 2013).*
Machine translation of Hideki JP2013240756A (Year: 2013).*
Li et al., Journal of Nanoscience and Nanotechnology, 9, 1530-1534, 2009 (Year: 2009).*
Zhang et al., Chem. Mater., 17, 13, 2005 (Year: 2005).*
Zhang et al., Journal of Solid State Chemistry, 180, 1456-1463, 2007 (Year: 2007).*
International Preliminary Report on Patentability and English translation of the Written Opinion of the International Searching Authority for International Application No. PCT/JP2018/008689, dated Sep. 10, 2019.
Akhavan et al., "Copper oxide nanoflakes as highly sensitive and fast response self-sterilizing biosensors," Journal of Materials Chemistry, vol. 21, 2011, pp. 12935-12940, 6 pages total.
Chinese Office Action and Search Report for Chinese Application No. 201880003095.9, dated Nov. 17, 2020, with an English translation.
Extended European Search Report for European Application No. 18763816.8, dated Dec. 11, 2020.
Varma et al., "Solution Combustion Synthesis of Nanoscale Materials," Chemical Reviews, vol. 116, 2016, pp. 14493-14586, 94 pages total.
International Search Report issued in PCT/JP2018/008689 (PCT/ISA/210), dated May 29, 2018.
Khun et al., "Urea Assisted Synthesis of Flower Like CuO Nanostructures and Their Chemical Sensing Application for the Determination of Cadmium Ions", Electroanalysis, vol. 25, No. 6, Jun. 2013, pp. 1425-1432.
Vaseem et al., "Flower-shaped CuO nanostructures: Structural, photocatalytic and XANES studies", Catalysis Communications, vol. 10, 2018, pp. 11-16.
Written Opinion of the International Searching Authority issued in PCT/JP2018/008689 (PCT/ISA/237), dated May 29, 2018.
Zhu et al., "Self-Assembled 3D Flower-Like Hierarchical β-Ni(OH)$_2$ Hollow Architectures and their In Situ Thermal Conversion to NiO", Nanoscale Research Letters, vol. 4, 2009, pp. 550-557.
Chinese Office Action for Chinese Application No. 201880003095. 9, dated Mar. 24, 2021, with an English translation.
Office Action dated Nov. 29, 2021 in corresponding Japanese Patent Application No. 2019-504626, with English translation.
Chinese Office Action for corresponding Chinese Application No. 201880003095.9, dated Aug. 4, 2021, with English translation.
Chinese Office Action and Search Report for Chinese Application No. 201880003095.9, dated Jan. 13, 2022, with an English translation.
Chinese Office Action for Chinese Application No. 201880003095. 9, dated Apr. 25, 2022, with English translation.
European Communication pursuant to Article 94(3) EPC for corresponding European Application No. 18763816.8, dated Nov. 29, 2023.
Jana et al., "CuO nanostructures on copper foil by a simple wet chemical route at room temperature," Materials Research Bulletin, vol. 45, 2010 (Available online Feb. 25, 2010), pp. 693-698.

* cited by examiner

THIN-FILM-LIKE COMPOSITE OF NANOCRYSTAL

CROSS REFERENCE TO RELATED APPLICATIONS

The present application is a continuation application of International Patent Application No. PCT/JP2018/008689 filed on Mar. 7, 2018, which claims the benefit of Japanese Patent Application No. 2017-043204 filed on Mar. 7, 2017. The contents of these applications are incorporated herein by reference in their entirety.

BACKGROUND

Technical Field

The present disclosure relates to a thin-film-like composite of nanocrystal having excellent handling properties.

Background

A nanocrystalline material is widely used as a catalyst, an electrode material, and the like in various fields. In recent years, further fineness of the nanocrystalline material, control of an active surface, and the like have been actively examined as nanoparticles having a nanometer scale particle diameter.

For example, Japanese Patent Application Publication No. 2013-240756 proposes a single nanocrystalline board-accumulative catalyst (nanoflower), in which single nanocrystalline boards each having a specific surface of a specific single crystal regarded as one surface are accumulated without facing and contacting the catalyst active surfaces between adjacent single nanocrystalline boards. Japanese Patent Application Publication No. 2013-240756 discloses that: by using the single nanocrystalline board-accumulative catalyst, a space (void portion) is secured in front of the catalyst active surface without facing and contacting the catalyst active surfaces even during thermal aggregation; deterioration in catalytic activity caused by the thermal aggregation can be suppressed; and the catalytic activity can be improved. Japanese Patent Application Publication No. 2013-240756 further discloses that by using a CuO single nanocrystalline board which has a catalyst active surface as a (001) plane and is a transition metal oxide, as the single nanocrystalline board, the material cost of the catalyst can be reduced.

However, the single nanocrystalline board-accumulative catalyst disclosed in Japanese Patent Application Publication No. 2013-240756 and a common nanocrystalline powder have a nanoscale (about 20 to 200 nm) particle diameter, which cause problems with handling properties in practical use.

Examples thereof include the following problems with the handling properties: (i) a nanocrystalline material having a powdery form cannot be used as it is, and thus it is necessary to fix the nanocrystalline material to a carrier having a given size using an adhesive or the like. In that case, it is necessary to provide a material in an amount 10 times or more that of the nanocrystalline material to be supported, which causes a material loss problem; (ii) the nanocrystalline material having a powdery form is dispersed and embedded in the adhesive before supporting, and thus, for example when the nanocrystalline material is assumed to be used as a catalyst, the active surface of the nanocrystalline material cannot be efficiently arranged on the supported surface, which causes the following problem: catalytic activity as the nanocrystalline material cannot be sufficiently exhibited; (iii) the nanocrystalline material having a powdery form is fine, which causes the following problem: a special jig and equipment are required during handling from the viewpoint of scattering prevention or the like; and (iv) such a fine nanocrystalline material causes troublesome washing and isolation after manufacturing, difficult storage in a fine state, and a dissipation problem.

The present disclosure has been made in view of the above-mentioned actual circumstances, and an object of the present disclosure is to provide a thin-film-like composite of nanocrystal, as a nanocrystalline material having excellent handling properties, which can overcome the above-mentioned problems of a nanocrystalline material having a powdery form while satisfactorily maintaining the properties of the nanocrystalline material (e.g., excellent catalytic activity).

SUMMARY

The present inventors have diligently conducted investigations into a novel composite of nanocrystal, and as a result, found that when a thin-film-like composite of nanocrystal includes a thin-film-like connected assembly in which a plurality of nanocrystalline pieces each having a flake-like form and having a main surface and an end surface are connected to each other, the main surfaces of the plurality of nanocrystalline pieces exposed to the outside of the connected assembly are arranged so as to form gaps therebetween, and the connected assembly has a plan view area of 1 $mm^2$ or more, excellent handling properties on a milli (meter) scale or more can be particularly achieved while maintaining the properties on a nano (meter) scale, thereby completing the present disclosure based on this finding.

That is, the gist constitution of the present disclosure is as follows.

[1] A thin-film-like composite of nanocrystal, characterized in that the thin-film-like composite of nanocrystal includes a thin-film-like connected assembly in which a plurality of nanocrystalline pieces each having a flake-like form and having a main surface and an end surface are connected to each other,
  the main surfaces of the plurality of nanocrystalline pieces exposed to the outside of the connected assembly are arranged so as to form gaps therebetween, and
  the connected assembly has a plan view area of 1 $mm^2$ or more.

[2] The thin-film-like composite of nanocrystal according to the above [1], wherein the nanocrystalline pieces each have a thickness of 0.5 to 100 nm; and a minimum size of the main surface is 10 times or more the thickness.

[3] The thin-film-like composite of nanocrystal according to the above [1] or [2], wherein the plan view area is 100 $mm^2$ or more.

[4] The thin-film-like composite of nanocrystal according to any one of the above [1] to [3], wherein the thin-film-like composite of nanocrystal has a specific surface area of 5 $m^2/g$ or more.

[5] The thin-film-like composite of nanocrystal according to any one of the above [1] to [4], wherein the nanocrystalline pieces contain copper oxide; and when, in a diffraction angle (2θ) of an X-ray diffraction spectrum, a highest peak intensity at 35.0 to 36.0 degrees is taken as I1 and a highest peak intensity at 38.5 to 40.0 degrees is taken as I2, the thinfilm-like composite of nanocrystal has a degree of crystal orientation having a peak intensity ratio I1/I2 of 1.05 or more.

The present disclosure can provide a thin-film-like composite of nanocrystal which can achieve excellent handling properties on a milliscale or more while maintaining the properties on a nanoscale.

BRIEF DESCRIPTION OF DRAWINGS

FIGS. 10A to 10C are observation photographs of a thin-film-like composite of nanocrystal according to Example 1 of the present disclosure. Particularly.

DETAILED DESCRIPTION

<Thin-Film-Like Composite of Nanocrystal>

A thin-film-like composite of nanocrystal according to the present disclosure is characterized in that the thin-film-like composite of nanocrystal includes a thin-film-like connected assembly in which a plurality of nanocrystalline pieces each having a flake-like form and having a main surface and an end surface are connected to each other, the main surfaces of the plurality of nanocrystalline pieces exposed to the outside of the connected assembly are arranged so as to form gaps therebetween, and the connected assembly has a plan view area of 1 mm² or more.

Such a composite of nanocrystal in which the plurality of nanocrystalline pieces are connected to each other has a macro size of milliscale or more unlike a conventional nanocrystalline material having a powdery form. Therefore, the composite of nanocrystal can be used as in a material having a thin film shape or a sheet shape in practical use, and thus (i) a portion of a carrier desired to be covered can be selectively covered, and a required amount of a composite of nanocrystal may be provided. In addition, (ii) a composite of nanocrystal having a thin film shape can be pasted with an adhesive and used, and thus for example when the composite of nanocrystal is assumed to be used as a catalyst, the active surface of the composite of nanocrystal can be efficiently arranged on a portion of a carrier (reaction surface) desired to be supported, which can achieve excellent catalytic activity. Furthermore, (iii) the composite of nanocrystal has a thin film shape, and thus the composite of nanocrystal can be easily handled and has excellent arrangement. (iv) The composite of nanocrystal provides easy washing and isolation after manufacturing, and can be easily stored without causing a problem such as dissipation.

Figure 1:
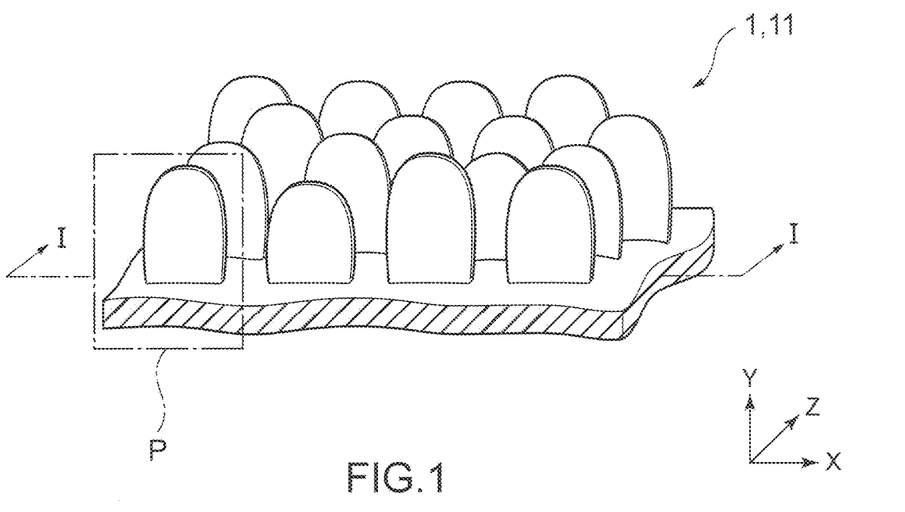
FIG. 1 is a schematic perspective view of a thin-film-like composite of nanocrystal according to the present disclosure.
Figure 2:
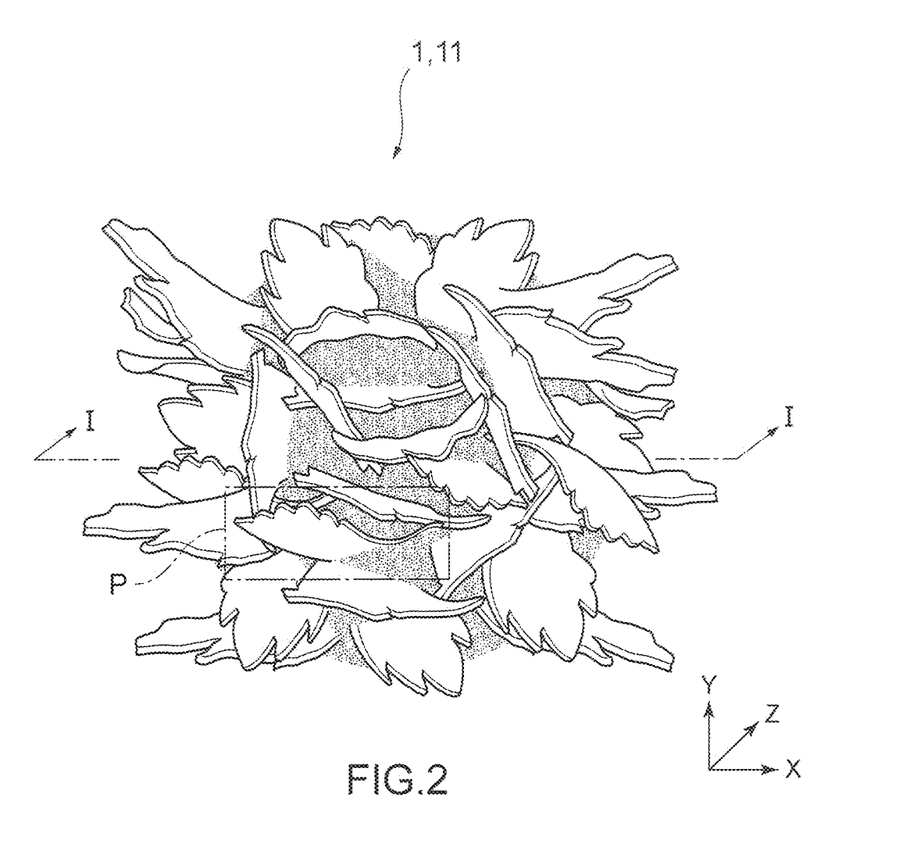
FIG. 2 is a more detailed schematic perspective view of the thin-film-like composite of nanocrystal according to the present disclosure.
Figure 3:
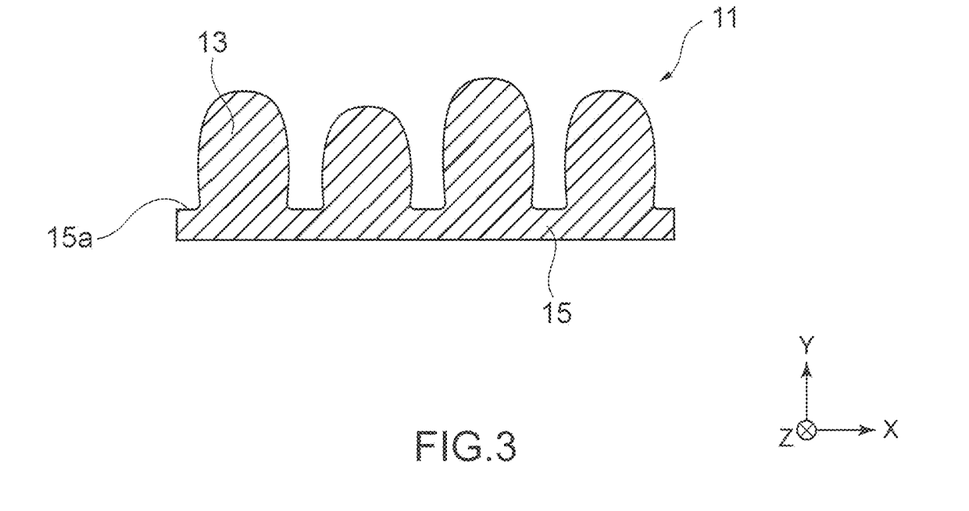
FIG. 3 is a schematic cross-sectional view illustrating an I-I cross-section (X-Y plane) of the schematic perspective view of the thin-film-like composite of nanocrystal of FIG. 1.
Figure 4:
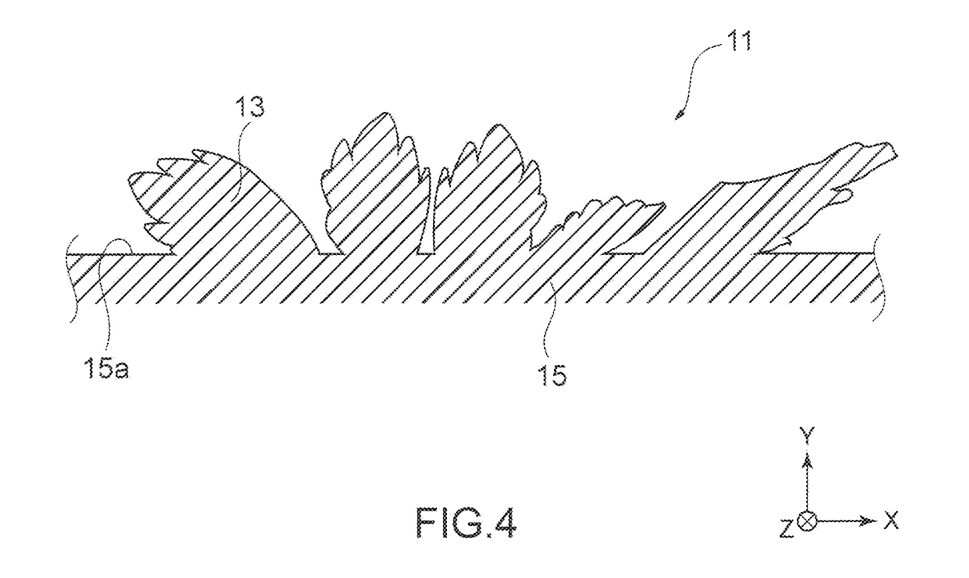
FIG. 4 is a more detailed schematic cross-sectional view illustrating the I-I cross-section (X-Y plane) of the schematic perspective view of the thin-film-like composite of nanocrystal of FIG. 2.
Figure 5:
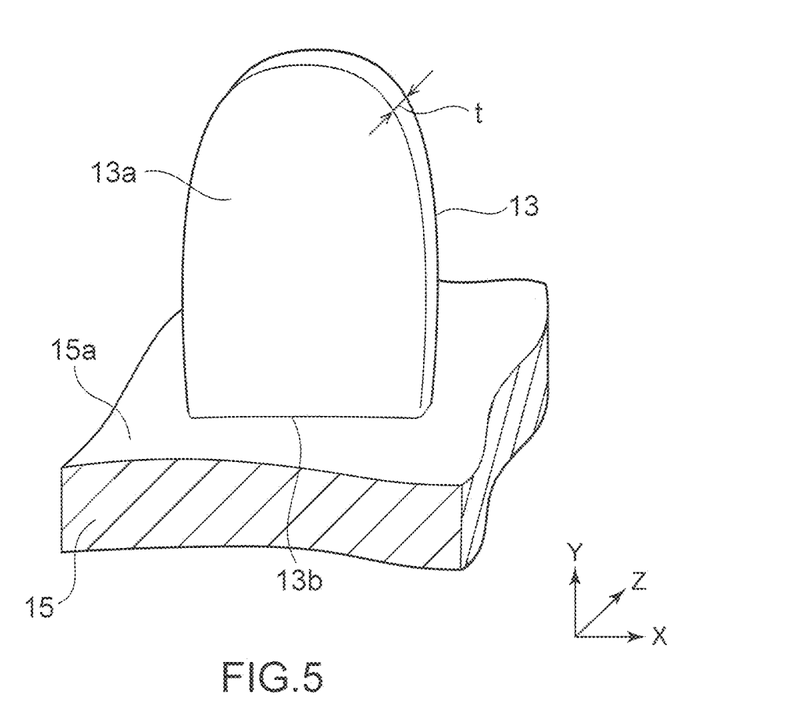
FIG. 5 is a schematic perspective view illustrating a region P of the thin-film-like composite of nanocrystal of FIG. 1 in an enlarged way.
Figure 6:
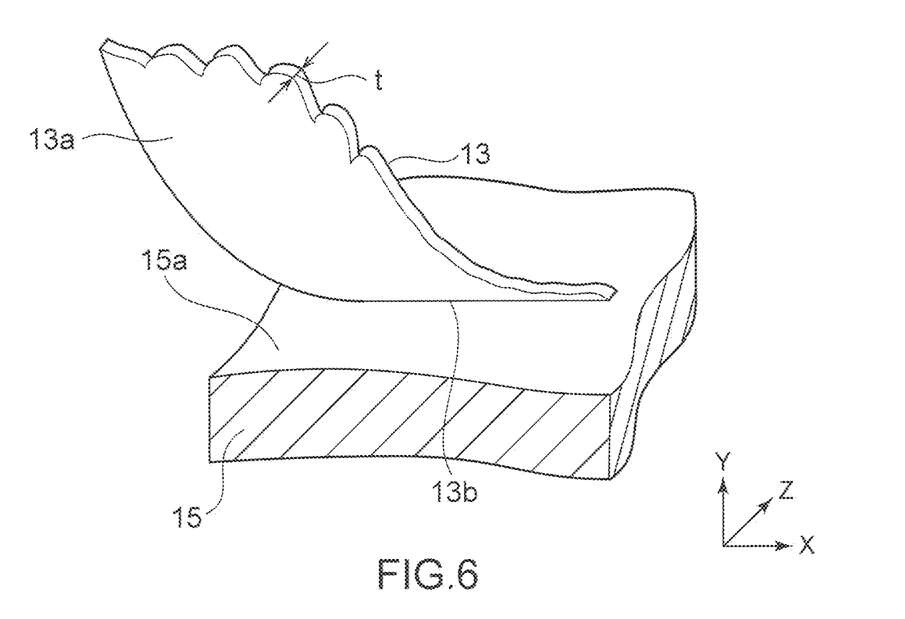
FIG. 6 is a more detailed schematic perspective view illustrating a region P of the thin-film-like composite of nanocrystal of FIG. 2 in an enlarged way.

FIGS. 1 and 2 show one embodiment of a thin-film-like composite of nanocrystal according to the present disclosure. In FIGS. 1 and 2, numeral number 1 designates a thin-film-like composite of nanocrystal (which hereinafter may be merely referred to as a "composite of nanocrystal"). FIGS. 3 and 4 are I-I cross-sectional views (X-Y plane) of the thin-film-like composite of nanocrystal 1 shown in FIGS. 1 and 2, respectively. In FIGS. 3 and 4, numeral number 11 designates a connected assembly; 13, a nanocrystalline piece; 15, a connected portion; and 15a, an exposed portion of the connected portion 15. FIGS. 5 and 6 are schematic perspective views illustrating a region P of the thin-film-like composite of nanocrystal of FIGS. 1 and 2, respectively, in an enlarged way. In FIGS. 5 and 6, numeral number 13a designates a main surface of the nanocrystalline piece 13, and numeral number 13b designates an end surface of the nanocrystalline piece 13.

As shown in FIGS. 1 to 6, the composite of nanocrystal 1 of the present disclosure includes a thin-film-like connected assembly 11 in which a plurality of nanocrystalline pieces each having a flake-like form and having a main surface 13a and an end surface 13b are connected to each other. The connecting state of the nanocrystalline pieces is not particularly limited, and it may be chemical bonding such as crystal growth, electrical bonding such as an electrostatic force, or accumulation bonding such as an intermolecular force. The nanocrystalline pieces may be wholly connected to each other to form a thin-film-like assembly. Particularly, it is preferable that, in the connected assembly 11, the nanocrystalline pieces be integrally connected to each other by chemical bonding.

As shown in FIGS. 3 and 4, the connected assembly 11 includes the thin-film-like connected portion 15 including the exposed portion 15a having a plan view area of 1 mm² or more. The exposed portion 15a of the connected portion 15 may be a site provided by the crystal growth of the nanocrystalline pieces, or a site provided by the accumulation of the nanocrystalline pieces. Such an exposed portion 15a has a plan view area of 1 mm² or more, and preferably 100 mm² or more. The connected assembly 11 including the exposed portion 15a of milliscale or more has excellent handling properties in practical use.

The respective end surfaces 13b of the plurality of nanocrystalline pieces are connected to the exposed portion 15a of the connected portion 15, and thereby the main surfaces 13a of the nanocrystalline pieces 13 exposed to the outside of the connected assembly 11 are arranged so as to form gaps therebetween. The main surfaces 13a of the plurality of nanocrystalline pieces 13 project from the exposed portion 15a in the outer direction of the connected assembly 11, and the main surfaces 13a are arranged along the plane direction of the thin-film-like connected portion 15. The main surfaces 13a project in a random direction from the exposed portion 15a. Furthermore, the main surfaces 13a of the nanocrystalline pieces 13 face to the random direction. The connected assembly 11 including the plurality of nanocrystalline pieces 13 can exhibit properties peculiar to the nanocrystalline material while having a size of milliscale or more. In such a connected assembly 11, the connecting state of the nanocrystalline pieces 13 having the main surface 13a projecting from the exposed portion 15a of the connected portion 15 is not particularly limited, and examples thereof include the bonding state as mentioned above. Particularly, from the viewpoint of increasing the bond strength of the nanocrystalline pieces 13 in the connected portion 15, the nanocrystalline pieces 13 are preferably connected to each other by chemical bonding in the connected portion 15.

Here, the nanocrystalline piece 13 is a portion constituting the connected assembly 11, and the main surface 13a is connected to the exposed portion 15a of the connected portion 15. As shown in FIGS. 5 and 6, such nanocrystalline pieces 13 each have a flake-like form and have the main surface 13a and the end surface 13b. Here, specifically, the main surface 13a of the nanocrystalline piece 13 means two surfaces each having a large surface area among external surfaces constituting the nanocrystalline piece 13 having a flake-like form and division-forming the upper and lower end edges of an end surface 13b having a narrow surface area. The main surface 13a of the nanocrystalline piece 13 preferably has a minimum size of 1 nm to 2 μm and a maximum size of 10 nm to 10 μm. The end surface of the nanocrystalline piece 13 preferably has a maximum size of $\frac{1}{10}$ of the minimum size of the main surface or 10 nm or less. The surface area ratio of the main surface 13a to the end surface 13b in the nanocrystalline piece 13 is preferably 10 times or more in that excellent catalytic activity is exhibited when the nanocrystalline piece 13 is used, for example, as a catalyst. The thickness t of the nanocrystalline piece 13 is preferably 0.5 to 100 nm, and more preferably 1 to 20 nm. The minimum size of the main surface 13a of the nanocrystalline piece 13 is preferably 10 times or more, and more preferably 20 times or more the thickness tin the relationship with the thickness t.

Figure 7:
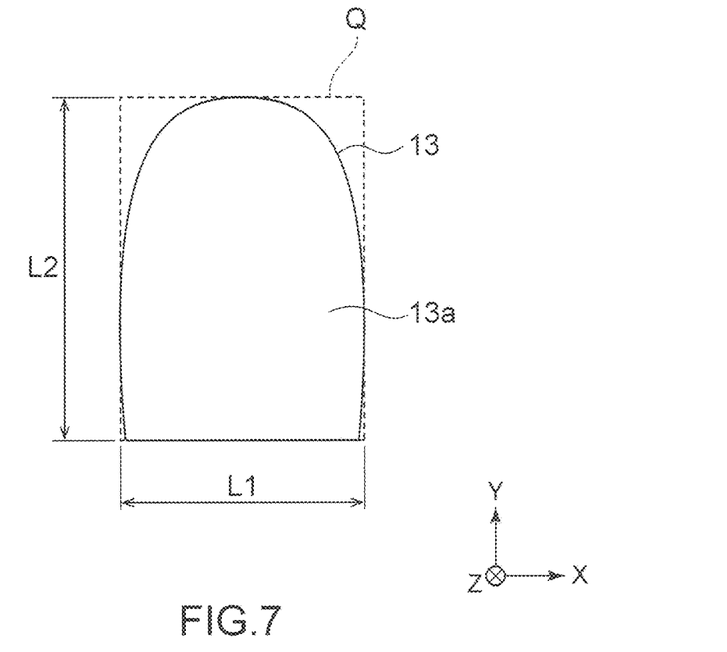
FIG. 7 is a schematic view illustrating nanocrystalline pieces separated from the thin-film-like composite of nanocrystal of FIG. 1 in an enlarged way in plan view of an X-Y plane.
Figure 8:
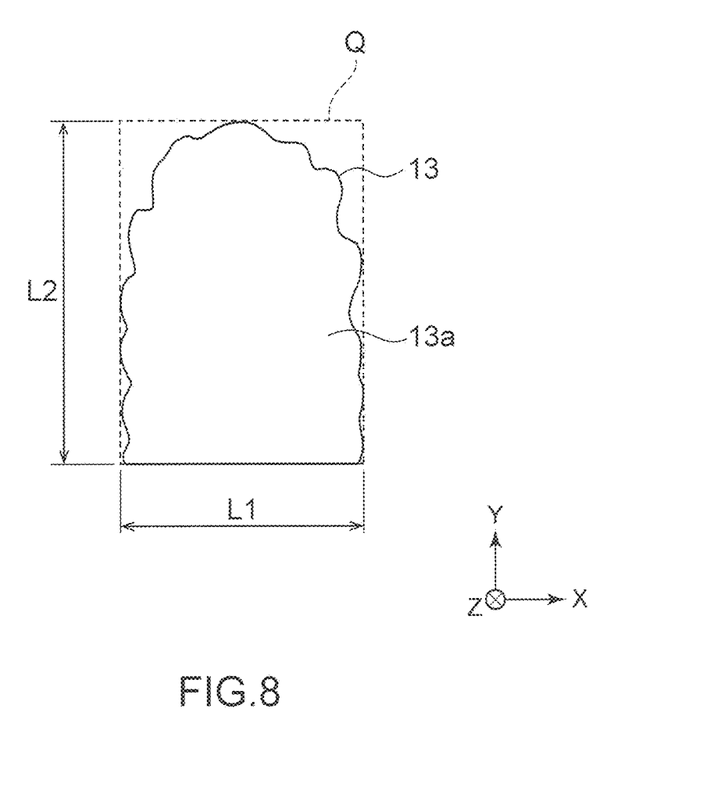
FIG. 8 is a more detailed schematic view illustrating nanocrystalline pieces separated from the thin-film-like composite of nanocrystal of FIG. 2 in an enlarged way in plan view of an X-Y plane.

The minimum and maximum sizes of the main surface 13a of the nanocrystalline piece 13 are obtained by measuring the nanocrystalline piece 13 separated from the connected portion 15 as an individual nanocrystalline piece so that shape of the nanocrystalline piece 13 is not impaired. Specifically, as shown in, for example, FIGS. 7 and 8, a circumscribed rectangle Q having a minimum area is drawn to the main surface 13a of the nanocrystalline piece 13. The short and long sides L1 and L2 of the rectangle Q are measured as the minimum and maximum sizes, respectively, of the nanocrystalline pieces 13. The measuring method will be specifically described in Examples.

The plurality of nanocrystalline pieces 13 project from the exposed portion 15a of the connected portion 15, and thus the connected assembly 11 has a comparatively large specific surface area. Such a connected assembly 11 preferably has a specific surface area of 5 m²/g or more, and more preferably 10 m²/g or more. The composite of nanocrystal 1 including such a connected assembly 11 exhibits excellent catalytic activity when the composite of nanocrystal 1 is used, for example, as a catalyst. The upper limit of the specific surface area of the connected assembly 11 is not particularly limited, and the upper limit as manufacturing or physical limitation is, for example, 100 m²/g.

The nanocrystalline pieces constituting the nanocrystal composite 1 of the present disclosure preferably contain at least one of a metal and a metal oxide.

Here, examples of the metal include precious metals, transition metals, and alloys containing these metals. Examples of the precious metals and the alloys thereof include metals containing one component selected from the group of palladium (Pd), rhodium (Rh), ruthenium (Ru), platinum (Pt), silver (Ag), and gold (Au), or alloys containing one or more components selected from the group. Examples of the transition metals and the alloys thereof include metals containing one component selected from the group of copper (Cu), nickel (Ni), cobalt (Co), and zinc (Zn), or alloys containing one or more components selected from the group.

Examples of the metal oxide include oxides and composite oxides of precious metals, transition metals, or alloys thereof. The precious metals and the transition metals are exemplified above.

Particularly, the nanocrystalline pieces preferably contain metal oxides containing one or two or more metals selected from the group of the transition metals. The metal oxides are preferable from the viewpoint of controlling the price since the metal oxides exist in abundance as metal resources on the earth and are more inexpensive than the precious metals. Among these, the nanocrystalline pieces preferably contain a metal oxide containing one or two or more metals selected from the group of Cu, Ni, Co, and Zn. The metal oxide more preferably contains at least copper. Examples of the metal oxide as above include nickel oxide, copper oxide, Ni—Cu oxide, and Cu—Pd oxide. Among these, copper oxide and Ni—Cu composite oxide are preferable.

As described above, the composite of nanocrystal 1 of the present disclosure is a thin-film-like accumulated product having a given size of milli order or more, in which the plurality of nanocrystalline pieces are connected to each other, and thus the composite of nanocrystal 1 also exhibits properties peculiar to the nanocrystalline material. Such a composite of nanocrystal 1 can be handled as a macro thin film of milli-order or more, and thus can achieve excellent non-conventional handling properties and workability as the nanocrystalline material. Meanwhile, the composite of nanocrystal can achieve surface properties which could not achieved by a conventional metallic foil such as an electrodeposited copper foil, and can exhibit properties peculiar to the nanocrystalline material such as a nanocrystalline powder while having a thin film shape.

Such a composite of nanocrystal 1 of the present disclosure can be used for various applications, and can be suitably used, for example, as a catalyst, an electrode material, and an artificial photosynthesis material.

Particularly, when the composite of nanocrystal 1 of the present disclosure is used as the catalyst, and the composite of nanocrystal 1 is supported on a base material, it is not necessary to disperse and embed the composite of nanocrystal 1 in an adhesive as in the nanocrystalline powder, and thus the active surface of the composite of nanocrystal can be efficiently arranged on the reaction surface, which provides an improved catalytic efficiency.

In the composite of nanocrystal 1 of the present disclosure as the catalyst, the main surface 13a of the nanocrystalline piece 13 is preferably configured to have a specific crystal orientation in order to serve as an active surface. When the composite of nanocrystal 1 is used as the catalyst, the nanocrystalline piece preferably contains a metal oxide.

Here, in order that the main surface 13*a* of the nanocrystalline piece 13 is configured to serve as a reducible active surface, the surfaces including metal atoms exhibiting catalytic activity in the metal oxide constituting the nanocrystalline piece may be oriented so as to be located on the main surface 13*a*, thereby constituting the main surface 13*a* from the surfaces including the metal atoms. Specifically, the proportion by number of the metal atoms to the metal atoms and the oxygen atoms constituting the metal oxide existing on the main surface 13*a* is preferably 80% or more.

In order that the main surface 13*a* is configured to serve as an oxidizing active surface, the surfaces including the oxygen atoms exhibiting catalytic activity in the metal oxide constituting the nanocrystalline piece may be oriented so as to be located in the main surface 13*a*, thereby constituting the main surface 13*a* from the surfaces including the oxygen atoms. Specifically, the proportion by number of the oxygen atoms to the metal atoms and the oxygen atoms constituting the metal oxide existing on the main surface 13*a* is preferably 80% or more.

By adjusting the proportion by number of the metal atoms or the oxygen atoms to the metal atoms and the oxygen atoms constituting the metal oxide existing on the main surface 13*a* of the nanocrystalline piece 13 according to the role of the active surface, the catalytic activity function of the main surface 13*a* can be improved, and sufficient catalytic activity can be exhibited as the nanocrystalline piece 13, and furthermore, the composite of nanocrystal 1.

The main surface 13*a* of the nanocrystalline piece 13 has the specific crystal orientation since a large number of crystal orientations on the main surface 13*a* vary with the type of the metal oxide constituting the nanocrystalline piece 13. For this reason, a crystal orientation of the main surface 13*a* is not specifically described. For example, when the metal oxide is copper oxide (CuO), the main crystal orientation of a single crystal constituting the main surface is preferably [001].

When the nanocrystalline piece 13 contains copper oxide (CuO), and in a diffraction angle (2θ) of an X-ray diffraction spectrum in the composite of nanocrystal 1, the highest peak intensity at 35.0 to 36.0 degrees is taken as I1, and the highest peak intensity at 38.5 to 40.0 degrees is taken as I2, the composite of nanocrystal 1 desirably has a degree of crystal orientation preferably having a peak intensity relationship of I1>I2, more preferably a peak intensity ratio I1/I2 of 1.05 or more, and still more preferably a peak intensity ratio I1/I2 of 1.2 or more.

Figure 9:
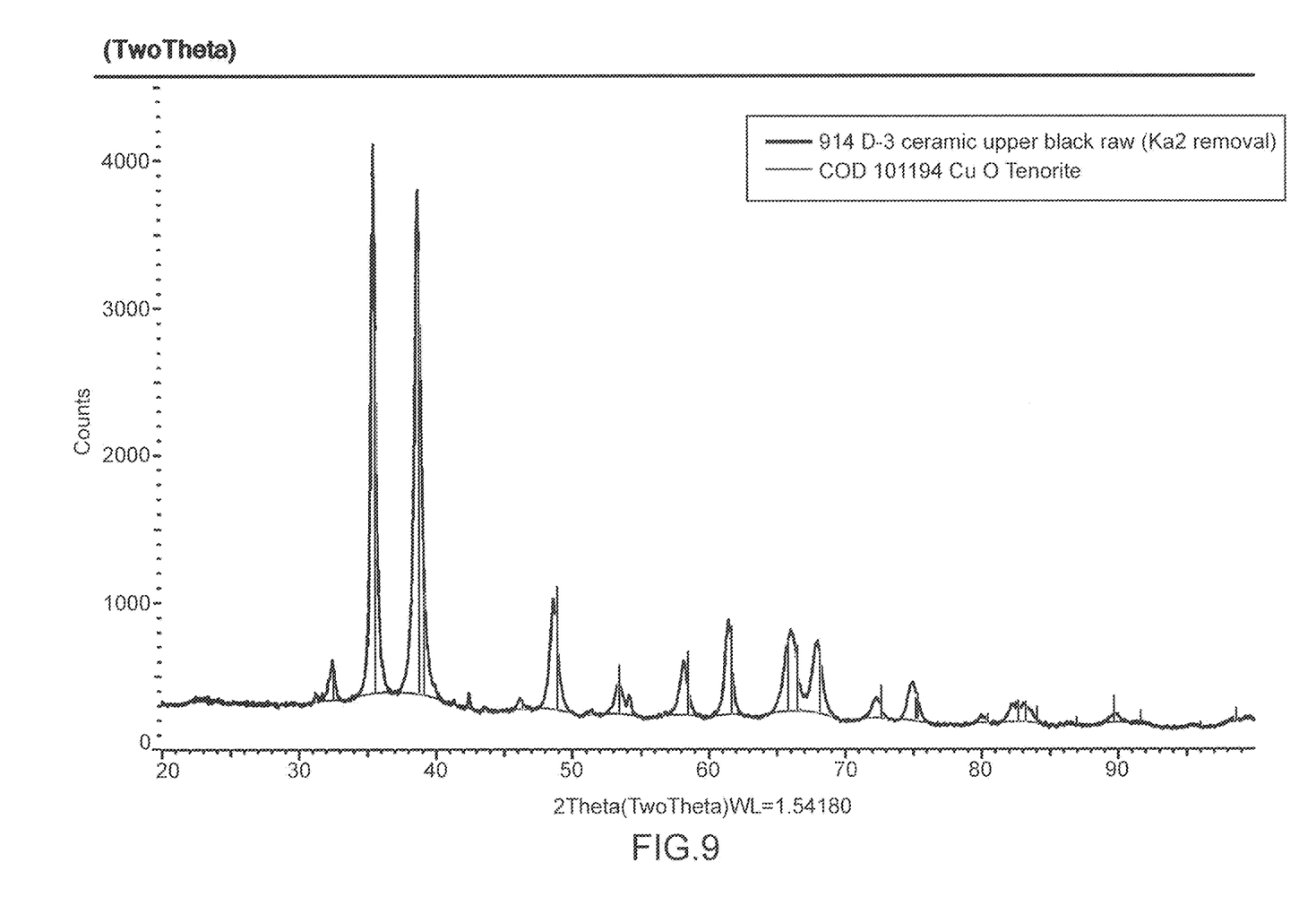
FIG. 9 is an example of an X-ray diffraction spectrum when the composite of nanocrystal of the present disclosure is subjected to structural analysis according to X-ray diffraction.

FIG. 9 shows peak results showing an example of an X-ray diffraction spectrum when the composite of nanocrystal 1 of the present disclosure is subjected to structural analysis according to X-ray diffraction. The measuring method will be described in Examples.

In FIG. 9, the highest peaks I1 and I2 have a peak intensity relationship of I1>I2. At this time, the highest peak intensity I1 is located at 35.64 degrees of a crystal plane (002), and the highest peak intensity I2 is located at 39.2 degrees of a (200) plane.

Meanwhile, when the highest peaks I1 and I2 have a peak intensity relationship of I1<I2, the highest peak intensity I1 is located at 35.76 degrees of a crystal plane (−1 11), and the highest peak intensity I2 is located at 38.96 degrees of a (111) plane.

That is, when the highest peaks I1 and I2 have a peak intensity relationship of I1>I2, and the peak intensity ratio I1/I2 is 1.05 or more, the copper oxide nanocrystal of the surface of the composite of nanocrystal 1 (that is, the copper oxide nanocrystal constituting the nanocrystalline piece 13) is oriented in a (002) plane which is an active surface effective for catalyst performance, and can exhibit high catalyst performance.

When constituting the main surface 13*a* from the metal atom surface, a metal atom surface is preferably located on the main surface 13*a* as a specific crystal oriented structure where the metal atom surface and an oxygen atom surface are regularly stacked alternately in the crystal structure of a metal oxide so that atoms are arranged in a regular manner. Specifically, the case where the metal atom surface exists on the main surface 13*a* includes not only a case of a structure where the main surface 13*a* contains an aggregate of single crystals having the same orientation but also a case of a structure where the main surface 13*a* contains an aggregate of single crystals having different crystal structures or different orientations, or an aggregate containing crystal grain boundaries or polycrystals.

<Method for Manufacturing Thin-Film-Like Composite of Nanocrystal>

Examples of the method for manufacturing the thin-film-like composite of nanocrystal of the present disclosure include a method for preferentially causing the two-dimensional growth of nanocrystalline pieces. In such a method, a boundary plane contacted with a boundary where different phases are present such as a boundary between a gas and a solution is used as a nucleation priority site. That is, for example, a composite of nanocrystal is formed as a thin film on a boundary plane between a gas and a solution, an interface between different liquids, or an interface with a base material (support base) arranged in a solution, or the like. In the manufacturing method of the present disclosure, the nanocrystalline pieces are two-dimensionally grown in a state where the nucleation site is limited, and thus the composite of nanocrystal is desirably manufactured at a temperature lower than that of a normal hydrothermal method.

Here, from the viewpoint of inducing growth in a two-dimensional direction, a support base is desirably set below a boundary plane between a gas and a solution in the solution. The material of the support base is not particularly limited, and examples thereof include metals, oxides, and nitrides. From the viewpoint of the support of a thin film, Teflon (registered trademark) is desirable, which has excellent chemical resistance at a temperature of up to 200° C.

The embodiment of the present disclosure has been described hereinabove, but the present disclosure is not limited to the above embodiment. The present disclosure includes all aspects included in the concept and claims of the present disclosure, and can be variously modified within the scope of the present disclosure.

EXAMPLES

Thereafter, Examples and Comparative Examples will be described to further clarify the advantageous effects of the present disclosure. However, the present disclosure is never limited to these Examples.

Example 1

2.0 g of copper chloride (II) dihydrate (manufactured by Junsei Chemical Co., Ltd.) and 1.6 g of urea (manufactured by Junsei Chemical Co., Ltd.) were mixed, and to the resultant mixture, 180 ml of ethylene glycol (manufactured by Junsei Chemical Co., Ltd.) and 120 ml of water were then added, followed by mixing. The resultant mixed solution of copper chloride and urea was injected into a pressure tight glass container having a content volume of 500 ml, and subjected to a heat treatment under a closed atmosphere at 150° C. for 12 hours in the container.

Then, the mixed solution was cooled to room temperature, and held for a day. A thin-film-like precipitate generated from the closed container was then collected. The precipitate was washed with methanol and pure water, and vacuum-dried under vacuum at 70° C. for 10 hours, to obtain a nanocrystalline copper oxide catalyst including a thin-film-like connected assembly in which copper oxide nanocrystalline pieces were connected to each other.

Example 2

1.4 g of copper chloride (II) dehydrate (same as the above) and 1.0 g of urea (same as the above) were mixed, and to the resultant mixture, 108 ml of ethylene glycol (same as the above) and 72 ml of water were added, followed by mixing. The resultant mixed solution of copper chloride and urea was injected into an autoclave closed container having a content volume of 300 ml and made of SUS, and subjected to a heat treatment at 150° C. for 24 hours in the container.

Then, the mixed solution was cooled to room temperature, and held for a day. A thin-film-like precipitate generated from the closed container was then collected. The precipitate was washed with methanol and pure water, and vacuum-dried under vacuum at 70° C. for 10 hours, to obtain a nanocrystalline copper oxide catalyst including a thin-film-like connected assembly in which copper oxide nanocrystalline pieces were connected to each other.

Comparative Example 1

2.0 g of copper chloride (II) dehydrate (same as the above) and 1.4 g of urea (same as the above) were mixed, and to the resultant mixture, 160 ml of ethylene glycol (same as the above) and 240 ml of water were added, followed by mixing. The resultant mixed solution of copper chloride and urea was injected into an autoclave closed container having a content volume of 500 ml and made of SUS, and subjected to a heat treatment at 180° C. for 36 hours in the container.

Then, the mixed solution was cooled to room temperature, and then taken out from the closed container. Furthermore, a precipitate generated in the mixed solution was collected. The precipitate was washed with methanol and pure water, and vacuum-dried under vacuum at 70° C. for 10 hours, to obtain a nanocrystalline copper oxide catalyst including copper oxide nanocrystalline pieces (having a powdery form).

Comparative Example 2

Commercially available copper oxide nanoparticles (544868 Copper (II) oxide manufactured by Sigma Aldrich Japan) were provided as Comparative Example 2. The copper oxide nanoparticles were used as a nanocrystalline copper oxide catalyst including spherical copper oxide nanocrystalline grains.

[Evaluation]

Properties shown below were evaluated by using the catalysts according to Examples and Comparative Examples. The evaluation condition of each of the properties is as follows. The results are shown in Table 1.

[1] Structure Observation

Figure 10A:
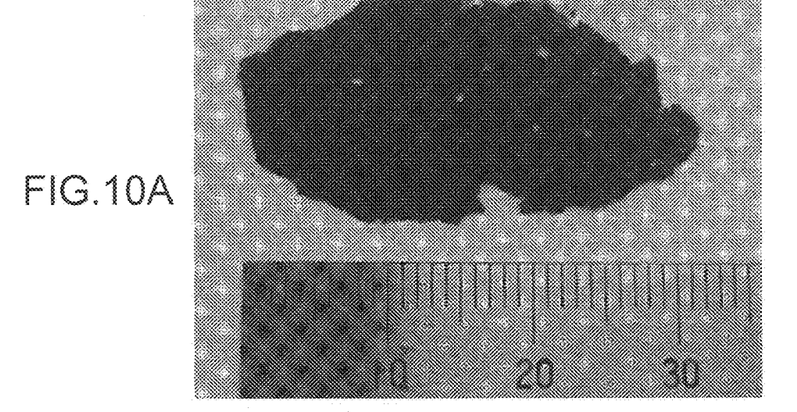
FIG. 10A is an appearance photograph of the thin-film-like composite of nanocrystal.
Figure 10B:
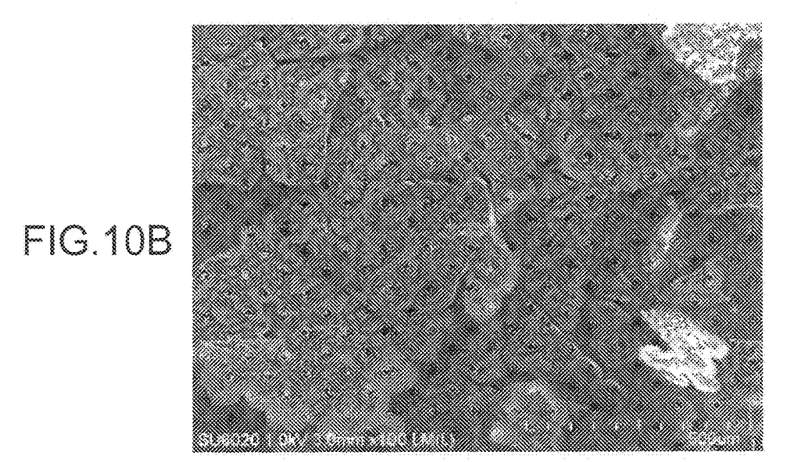
FIGS. 10B and 10C are SEM images.
Figure 10C:
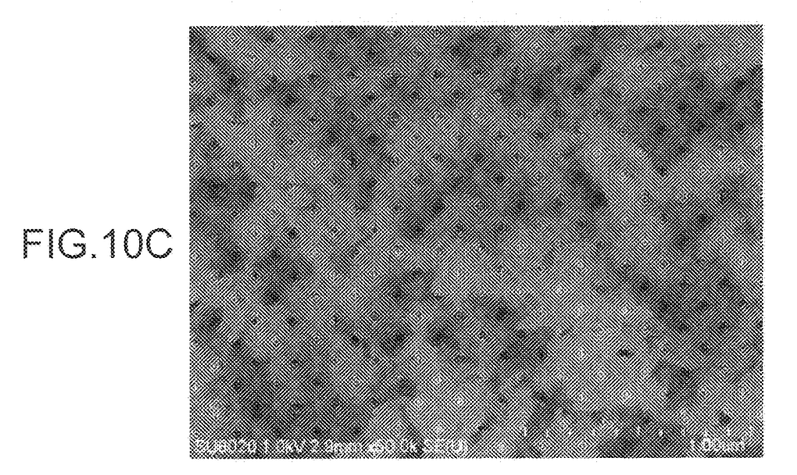
Figure 11:
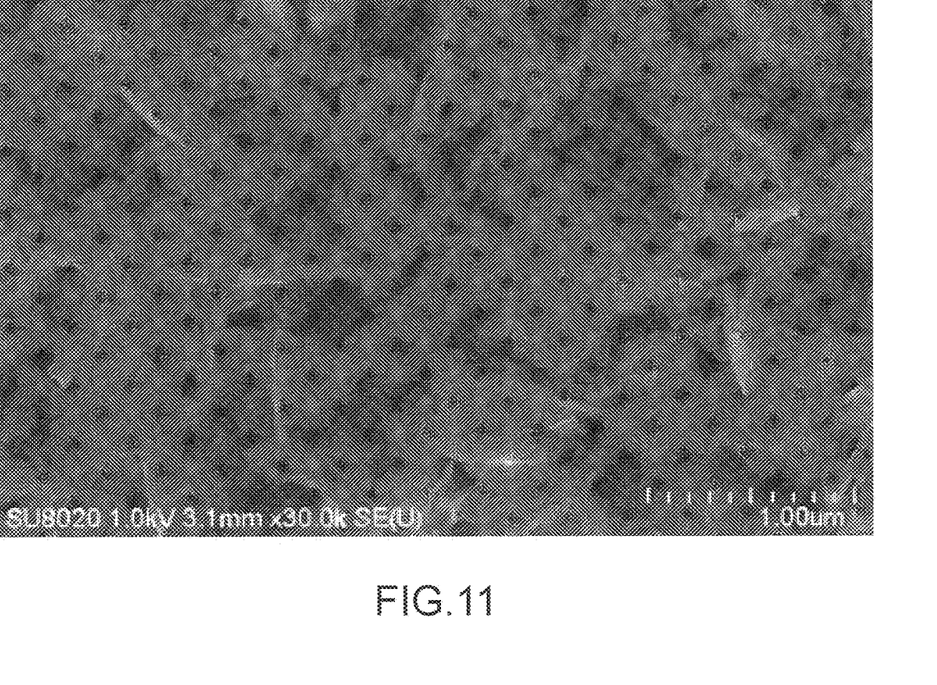
FIG. 11 is a SEM image of a thin-film-like composite of nanocrystal according to Example 2 of the present disclosure.
Figure 12:
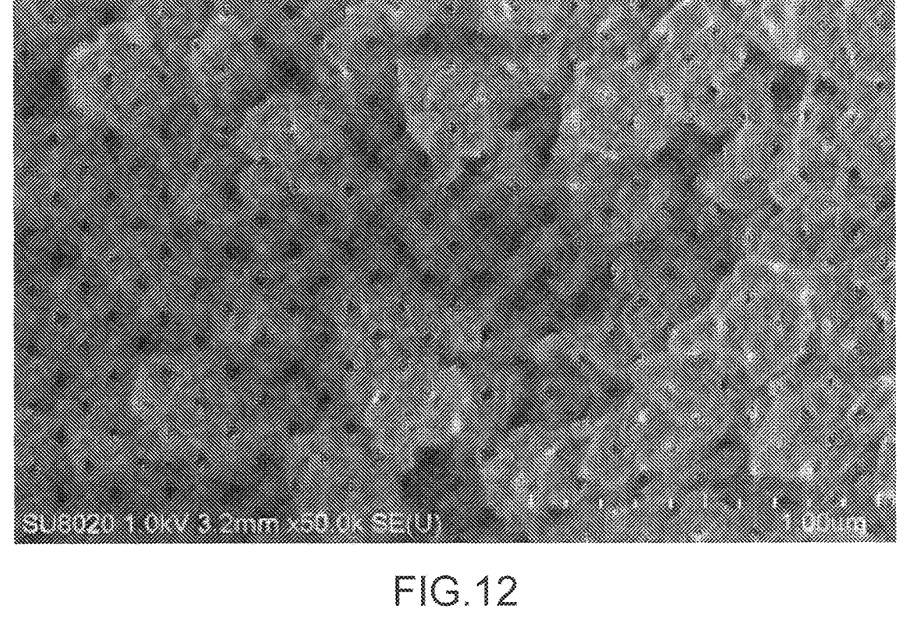
FIG. 12 is a SEM image of nanocrystalline pieces having a powdery form and produced in Comparative Example 1.

The microstructure was observed by using a microscope (manufactured by Keyence Corporation) and a scanning electron microscope (SEM, manufactured by JEOL Co., Ltd.). In microscope observation, the whole appearance of the whole film and the continuity of the film were confirmed. The structure of nanocrystalline pieces was confirmed in SEM observation. The observation results of Examples 1 and 2 and Comparative Example 1 are shown as photographs in FIGS. 10A, 10B, 10C to 12. Particularly, FIG. 10A shows an appearance photograph of the nanocrystalline copper oxide catalyst (area: about 255 mm$^2$, weight: 20.06 g) including the thin-film-like connected assembly produced in Example 1. FIG. 10B shows a SEM image observed at a magnification of 100 times. FIG. 10C shows a SEM image observed at a magnification of 50,000 times. FIG. 11 shows a SEM image of the nanocrystalline copper oxide catalyst including the thin-film-like connected assembly produced in Example 2, and observed at a magnification of 30,000 times. Furthermore, FIG. 12 shows a SEM image of the nanocrystalline copper oxide catalyst which includes the nanocrystalline pieces having a powdery form and produced in Comparative Example 1, and is observed at a magnification of 50,000 times.

Here, in the appearance photograph taken from a direction perpendicular to the surface of the connected assembly, the outline of the connected assembly is specified and subjected to image analysis, to calculate the plan view area of the connected portion of the connected assembly.

The SEM image taken at a magnification of 50,000 times were analyzed to measure the thicknesses and minimum sizes of the nanocrystalline pieces constituting the connected assembly, and the nanocrystalline pieces having a powdery form, and the particle diameters of the spherical nanocrystalline grains having a powdery form. Particularly, the nanocrystalline pieces were individuated without breaking the shape of the nanocrystalline pieces. The individuated nanocrystalline pieces were observed at the magnification, and the SEM image was analyzed to calculate the thickness and minimum size of the nanocrystalline pieces.

The thicknesses and minimum sizes of the nanocrystalline pieces constituting the connected assembly, and the nanocrystalline pieces having a powdery form, and the particle diameter of the spherical nanocrystalline grains having a powdery form are values obtained from measurement and average for ten optionally selected nanocrystalline pieces and nanocrystalline grains.

[2] Measurement of Crystal Orientation According to X-Ray Diffraction

The structural analysis was performed by an X-ray diffraction apparatus (D8 DISCOVER, manufactured by Bruker AXS GmbH). The composition of each of the catalysts was identified by the X-ray diffraction, and confirmed to be a copper oxide (CuO) simple substance. Furthermore, when, in a diffraction angle (2θ) of an X-ray diffraction spectrum, a highest peak intensity at 35.0 to 36.0 degrees is taken as I1 and a highest peak intensity at 38.5 to 40.0 degrees is taken as I2, a peak intensity ratio I1/I2 was obtained as a degree of crystal orientation.

[3] Measurement of Specific Surface Area

According to a BET method based on JIS Z 8830: 2013, the specific surface area was measured by a high definition multi-detection gas adsorption measuring apparatus (AutoSorb-iQ2, manufactured by Quantachrome Instruments Japan) using nitrogen gas. The specific surface area was measured after vacuum deairing at 200° C. for 3 hours as a pretreatment condition.

[4] Measurement of Extraction Rate (Handling Properties)

In order to evaluate the handling properties, the extraction rate was measured by the following method.

First, 20 mg of glass wool was charged in a glass test tube having a length of 200 mm. 5 mg of a catalyst was weighed, and placed on the glass wool in the test tube. Furthermore, 20 mg of glass wool was charged in the glass test tube so that the glass wool was placed on the catalyst. Then, the whole glass wool and the catalyst were taken out from the test tube, arranged on medical paper, and the glass wool and the catalyst taken out once were charged in the test tube according to the same procedure again. The whole glass wool and the catalyst were taken out from the test tube, and the weight of the catalyst taken out for the second time was measured. The ratio of the catalyst to the weight of the catalyst weighed first (the weight of the catalyst taken out for the second time×100/the weight of the catalyst weighed first) was calculated, and evaluated as the extraction rate (%). In the present Examples, the extraction rate of 90% or more was taken as an acceptable level.

[5] Measurement of Recovery Rate (Dissipation Resistance)

In order to evaluate the dissipation resistance, the recovery rate was measured by the following method.

First, 10 mg of the catalyst was dispersed in glass wool. The glass wool containing the dispersed catalyst was placed in a closed glass container filled with argon (Ar) gas, and heated to 200° C. Then, a mixed gas of carbon monoxide (CO) and nitric monoxide (NO) (Ar:CO:NO was 98:1:1 in a mass ratio) was introduced into the container, to replace the gas in the container by the mixed gas for a catalyst reaction. Then, the catalyst was taken out from the glass container, and separated from the glass wool, and the weight of the collected catalyst was then measured. The ratio of the collected catalyst to the weight of the catalyst weighed first (the weight of the collected catalyst×100/the weight of the catalyst weighed first) was calculated, and evaluated as the recovery rate (%). In the present Examples, the recovery rate of 90% or more was taken as an acceptable level.

[6] Catalyst Performance

The catalyst performance was evaluated by using an apparatus including a gas supply line, a reaction pipe, and a gas sampling portion. Specifically, the catalyst performance was evaluated as follows.

First, 20 mg of the catalyst was charged in a glass filter of the reaction pipe. Thereafter, the reaction pipe in which the catalyst was charged was set in the apparatus, and a constant temperature bath including the reaction pipe was heated at 10° C./min from room temperature to 200° C. At this time, a reaction pipe inlet gas (raw material gas) and a reaction pipe outlet gas were extracted, and subjected to gas analysis, to calculate a NO conversion ratio and a CO conversion ratio.

A mixed gas of carbon monoxide and nitric monoxide (Ar:CO:NO was 98:1:1 in a mass ratio) was used for the raw material gas. The flow rate of the raw material gas was adjusted so that the flow rate of the mixed gas was set to 50 mL/min by measuring the flow rate of each gas (Ar, CO, and NO) with a float type flowmeter, and adjusting the flow rate with a secondary pressure fluctuation type flow controller valve. The reaction pipe was made of silica glass, and a SUS pipe was connected and used in order to preliminarily heat the gas supplied to the reaction pipe.

The reaction pipe inlet gas and reaction pipe outlet gas were extracted by a 1 L aluminum bag from the outlets of a four-way valve and a three-way valve for 20 minutes. In order to analyze the extracted gas, a gas chromatograph (GC-8A, manufactured by Shimadzu Corporation) was used for nitrogen ($N_2$), nitric monoxide (NO), and carbon monoxide (CO), and a gas chromatograph (GC-2010, manufactured by Shimadzu Corporation) was used for carbon dioxide ($CO_2$). Furthermore, the NO conversion ratio and the CO conversion ratio were calculated according to the following formulae (1) and (2) from the amount (ppm) of each of nitrogen, nitric monoxide, carbon monoxide, and carbon dioxide in each of gases extracted at the inlet and outlet of the reaction pipe.

$$\text{NO Conversion Ratio (\%)} = \{N_2(\text{Outlet}) - N_2(\text{Inlet})\} \times 100/\text{NO(Inlet)} \quad (1)$$

$$\text{CO Conversion Ratio (\%)} = CO_2(\text{Outlet}) \times 100/\text{CO (Raw Material Gas)} \quad (2)$$

The NO conversion ratio and the CO conversion ratio of 50% or more were evaluated as good in the present Examples.

[Table 1]

TABLE 1

| | Shape | Base portion Plan view area of connected surface mm² | Nanocrystalline piece (parts) Thickness nm | Nanocrystalline piece (parts) Minimum size nm | Spherical nanocrystalline grain Particle diameter nm | Spherical nanocrystalline grain Degree of orientation I1/I2 |
|---|---|---|---|---|---|---|
| Example 1 | Thin-film-like | 255 | 1 | 100 | — | 1.1 |
| Example 2 | Thin-film-like | 160 | 2 | 200 | — | 1.3 |
| Comparative Example 1 | Powdery form | — | 1 | 300 | — | 1.2 |
| Comparative Example 2 | Powdery form | — | | | 40 | 0.8 |

| | Specific surface area m²/g | Extraction rate (handling properties) % | Recovery rate (dissipation resistance) % | Catalyst performance NO conversion ratio % | Catalyst performance CO conversion ratio % |
|---|---|---|---|---|---|
| Example 1 | 16 | 95 | 92 | 61 | 54 |
| Example 2 | 18 | 95 | 91 | 84 | 60 |
| Comparative Example 1 | 11 | 85 | 82 | 57 | 66 |

TABLE 1-continued

| | | | | | |
|---|---|---|---|---|---|
| Comparative Example 2 | 29 | <u>75</u> | <u>75</u> | 36 | 32 |

(Note)
Underlined types in Table represent values outside the appropriate range of the present invention, and values of which the evaluation results do not reached an acceptable level in the present Examples.

As shown in FIG. 10C and FIG. 11, in Examples 1 and 2, it was confirmed that the main surfaces of the plurality of nanocrystalline pieces project from the exposed portion, and the main surfaces are arranged along the plane direction of the thin-film-like connected portion, and thus the thin-film-like connected assembly having given continuity is provided (FIGS. 10A and 10B showed Example 1, and the same thin-film-like connected assembly was observed also in Example 2). Therefore, in Examples 1 and 2, it was confirmed that a powder of the nanocrystalline pieces is not provided. It was confirmed that such a thin-film-like composite of nanocrystal of the present disclosure adheres to the container or the like in some degree under the influence of static electricity, but it can be extracted with tweezers, and has a strength supporting its weight without collapsing during the extraction. As shown in Table 1, it was confirmed that, when the thin-film-like composite of nanocrystal of the present disclosure is particularly used as the catalyst, the thin-film-like composite of nanocrystal exhibits excellent properties balanced in all the items of handling properties, dissipation resistance, and catalyst performance. The change in the shape or the like of the catalyst including the thin-film-like composite of nanocrystal of the present disclosure was not observed before and after the catalyst reaction, and the stability of the catalyst over the catalyst reaction was also confirmed.

Meanwhile, as shown in FIG. 12, in the catalyst of Comparative Example 1, it was confirmed that the main surfaces of the plurality of nanocrystalline pieces do not project from the exposed portion, and the nanocrystalline pieces having a powdery form aggregate. Particularly, it was confirmed that the catalyst of Comparative Example 1 has a powdery form, and thus the catalyst of Comparative Example 1 has poorer handling properties than those of the thin-film-like composite of nanocrystal of the present disclosure (Examples 1 and 2). In the catalyst of Comparative Example 1, the nanocrystalline pieces have no continuity, cannot be extracted in a lump state, i.e., grasped with tweezers. The nanocrystalline pieces scatter into the air and adhere to the container or the like under the influence of static electricity, and are apt to disappear. The change in the shape or the like of the catalyst including the nanocrystalline pieces having a powdery form of Comparative Example 1 was not observed before and after the catalyst reaction, and the stability of the catalyst over the catalyst reaction was confirmed.

The catalyst of Comparative Example 2 contains the spherical nanocrystalline grains having a powdery form. Therefore, particularly, it was confirmed that the catalyst of Comparative Example 2 has a powdery form, and thus the catalyst of Comparative Example 2 has poorer handling properties than those of the composite of nanocrystal of the present disclosure (Examples 1 and 2) as in the nanocrystalline pieces of Comparative Example 1. In the catalyst of Comparative Example 2, the spherical nanocrystalline grains cannot be extracted in a lump state, i.e., grasped with tweezers. The spherical nanocrystalline grains scatter into the air and adhere to the container or the like under the influence of static electricity, and are apt to disappear. From Table 1, it was confirmed that the catalysts of Comparative Examples 1 and 2 have a powdery form, and thus the catalysts have poorer dissipation resistance and extraction rate than those of the thin-film-like composite of nanocrystal of the present disclosure (Examples 1 and 2). Furthermore, the catalysts of Comparative Examples 1 and 2 had a remarkably poorer NO conversion ratio than that of the thin-film-like composite of nanocrystal of the present disclosure (Examples 1 and 2) in the catalyst performance. The catalyst of Comparative Example 2 had a NO conversion ratio and a CO conversion ratio poorer than those of Examples 1 and 2. In the catalyst of Comparative Example 2, the dissipation of the powder and the partial change of the catalyst to copper were observed before and after the catalyst reaction, and the dissipation properties and the instability of the catalyst over the catalyst reaction were particularly confirmed.

What is claimed is:

1. A film-shaped single-layer composite of nanocrystal, characterized in that
    the film-shaped single-layer composite of nanocrystal
        consists of a film-shaped single-layer connected assembly in which a plurality of nanocrystalline pieces each having a flake-shaped form and having a main surface and an end surface are connected to each other,
    the main surface of each of the plurality of nanocrystalline pieces exposed to the outside of the connected assembly is arranged so as to form gaps therebetween,
    wherein the film-shaped single-layer connected assembly includes a film-shaped connected portion including protruding nanocrystalline pieces from a surface of the film-shaped connected portion, wherein the film-shaped connected portion excluding the protruding nanocrystalline pieces is exposed to the outside of the connected assembly and has a plan view area of 1 mm$^2$ or more,
    wherein the plurality of nanocrystalline pieces contain copper oxide; and
    when, in a diffraction angle (2θ) of an X-ray diffraction spectrum, a highest peak intensity at 35.0 to 36.0 degrees is taken as I1 and a highest peak intensity at 38.5 to 40.0 degrees is taken as I2, the film-shaped single-layer composite of nanocrystal has a degree of crystal orientation having a peak intensity ratio I1/I2 of 1.05 or more.

2. The film-shaped single-layer composite of nanocrystal according to claim 1,
    wherein:
    the nanocrystalline pieces each have a thickness of 0.5 to 100 nm; and
    a minimum size of the main surface is 10 times or more the thickness.

3. The film-shaped single-layer composite of nanocrystal according to claim 1, wherein the plan view area is 100 mm$^2$ or more.

4. The film-shaped single-layer composite of nanocrystal according to claim 1, wherein the film-shaped single-layer composite of nanocrystal has a specific surface area of 5 m$^2$/g or more.

5. The film-shaped single-layer composite of nanocrystal according to claim 1, wherein the film-shaped single-layer composite of nanocrystal, consisting of the film-shaped connected assembly, is further supported by a support base for inducing growth of the plurality of nanocrystalline pieces in a two-dimensional direction, and the film-shaped single-layer composite of nanocrystal is formed on a boundary plane of the support base.

\* \* \* \* \*